United States Patent
Sun et al.

(10) Patent No.: US 12,501,194 B2
(45) Date of Patent: Dec. 16, 2025

(54) FABRIC-COVERED ELECTRONIC DEVICE WITH LIGHT-EMITTING COMPONENTS

(71) Applicant: Apple Inc., Cupertino, CA (US)

(72) Inventors: Yu P Sun, Yorba Linda, CA (US); Caijie Yan, Shanghai (CN); Jared M Kole, San Jose, CA (US); Jia Chen Pang, San Jose, CA (US); Jun Qi, San Jose, CA (US); Ka Ho P Poon, Santa Clara, CA (US); Lindsay M Epstein, San Francisco, CA (US); Pulkit Verma, Sunnyvale, CA (US); Rong Liu, Sunnyvale, CA (US); Syed F Mohiuddin, Santa Clara, CA (US); Victor H Yin, Cupertino, CA (US); Zhongnan Hu, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 440 days.

(21) Appl. No.: 18/177,593

(22) Filed: Mar. 2, 2023

(65) Prior Publication Data
US 2024/0250077 A1    Jul. 25, 2024

Related U.S. Application Data

(60) Provisional application No. 63/480,882, filed on Jan. 20, 2023.

(51) Int. Cl.
*H04R 1/02* (2006.01)

(52) U.S. Cl.
CPC .................................. *H04R 1/028* (2013.01)

(58) Field of Classification Search
CPC ................. H04R 1/028; F21Y 2105/18; G02F 1/133603; G02F 1/133606; G02F 1/133608
See application file for complete search history.

(56) References Cited

U.S. PATENT DOCUMENTS

| 4,580,793 A | * | 4/1986 | Bronson | F16J 15/3488 29/516 |
| 5,615,893 A | * | 4/1997 | Reagan | F16J 15/3488 277/399 |

(Continued)

FOREIGN PATENT DOCUMENTS

| CN | 116149096 A | * | 5/2023 | ....... G02F 1/133603 |
| KR | 102729993 B1 | * | 11/2024 | ......... G02F 1/13452 |

*Primary Examiner* — Alexander K Garlen
(74) *Attorney, Agent, or Firm* — Treyz Law Group, P.C.; Joseph F. Guihan; Jinie M. Guihan (57) ABSTRACT

An electronic device such as a voice-controlled speaker device may have a cylindrical shape. The electronic device may include a housing, a speaker in the housing configured to emit sound, and a display in the housing. The display may include a substrate, light-emitting components mounted on the substrate, an opaque support structure mounted on the substrate, a diffuser that is mounted to the opaque support structure and that overlaps the light-emitting components, a display cover layer that overlaps the diffuser, and foam that is interposed between the opaque support structure and the display cover layer. The light-emitting components may be arranged in groups that have the same layout and orientations that vary as a function of angular position relative to the center of the display. The foam and/or an adhesive layer may be formed from two or more discrete pieces that have footprints with complementary protrusions.

14 Claims, 7 Drawing Sheets

(56) References Cited

U.S. PATENT DOCUMENTS

| | | | | |
|---|---|---|---|---|
| 6,308,960 B1* | 10/2001 | Peale | .................. | H04R 9/00 |
| | | | | 277/631 |
| 9,122,011 B2 | 9/2015 | Oh et al. | | |
| 9,277,615 B2 | 3/2016 | Sakai et al. | | |
| 9,326,346 B2 | 4/2016 | Catalano et al. | | |
| 9,930,444 B1* | 3/2018 | Stanley | .................. | H04R 3/12 |
| 10,728,652 B2 | 7/2020 | Stanley et al. | | |
| 10,802,336 B2 | 10/2020 | Liu et al. | | |
| 11,146,871 B2 | 10/2021 | Sunshine et al. | | |
| 11,206,470 B1* | 12/2021 | Gould | ................ | H04R 1/2834 |
| 2013/0135856 A1* | 5/2013 | Arai | .................. | F21V 29/773 |
| | | | | 362/231 |
| 2016/0091093 A1* | 3/2016 | Lee | .................. | B32B 7/12 |
| | | | | 277/630 |
| 2018/0219147 A1* | 8/2018 | Ogata | ................ | F21V 29/502 |
| 2018/0220213 A1* | 8/2018 | Wu | .................. | H04R 1/26 |
| 2020/0154184 A1 | 5/2020 | Wu et al. | | |
| 2020/0204909 A1* | 6/2020 | Stanley | ................ | H04R 1/025 |
| 2021/0064167 A1 | 3/2021 | Hsu et al. | | |
| 2022/0042676 A1* | 2/2022 | Liu | .................. | G06F 1/163 |

* cited by examiner

FABRIC-COVERED ELECTRONIC DEVICE WITH LIGHT-EMITTING COMPONENTS

This application claims the benefit of U.S. Provisional Patent Application No. 63/480,882, filed Jan. 20, 2023, which is hereby incorporated by reference herein in its entirety.

FIELD

This relates generally to electronic devices and, more particularly, to electronic devices with light-emitting components.

BACKGROUND

Electronic devices such as voice-controlled assistant devices may include fabric. As an example, the housing of a voice-controlled assistant device may be covered with a layer of fabric. Openings may be provided in the fabric to allow sound to be emitted from within the device.

It may be challenging to enhance the functionality of a voice-controlled assistant device. For example, it may be difficult to integrate light-emitting devices into a voice-controlled assistant device with a fabric layer. If care is not taken, the fabric may impart an undesired appearance to emitted light, thereby preventing a light-emitting device from effectively conveying information to a user.

SUMMARY

An electronic device may include a housing, a speaker in the housing configured to emit sound, and a display in the housing. The display may include a substrate, light-emitting components mounted on the substrate, an opaque support structure mounted on the substrate, a diffuser that is mounted to the opaque support structure and that overlaps the light-emitting components, a display cover layer that overlaps the diffuser, and foam that is interposed between the opaque support structure and the display cover layer.

An electronic device may include a housing, a speaker in the housing configured to emit sound, and a display in the housing. The display may have a center and may include light-emitting component groups arranged around the center, each light-emitting component group may have a layout and an orientation, the layouts of the light-emitting component groups may be the same, and the orientations of the light-emitting component groups may vary as a function of angular position relative to the center.

An electronic device may include a housing, a speaker in the housing configured to emit sound, and a display in the housing. The display may include a substrate, a red light-emitting diode mounted on the substrate, a first thermistor associated with the red light-emitting diode, a green light-emitting diode mounted on the substrate, a second thermistor associated with the green light-emitting diode, a blue light-emitting diode mounted on the substrate, and a third thermistor associated with the blue light-emitting diode.

DETAILED DESCRIPTION

Figure 1:
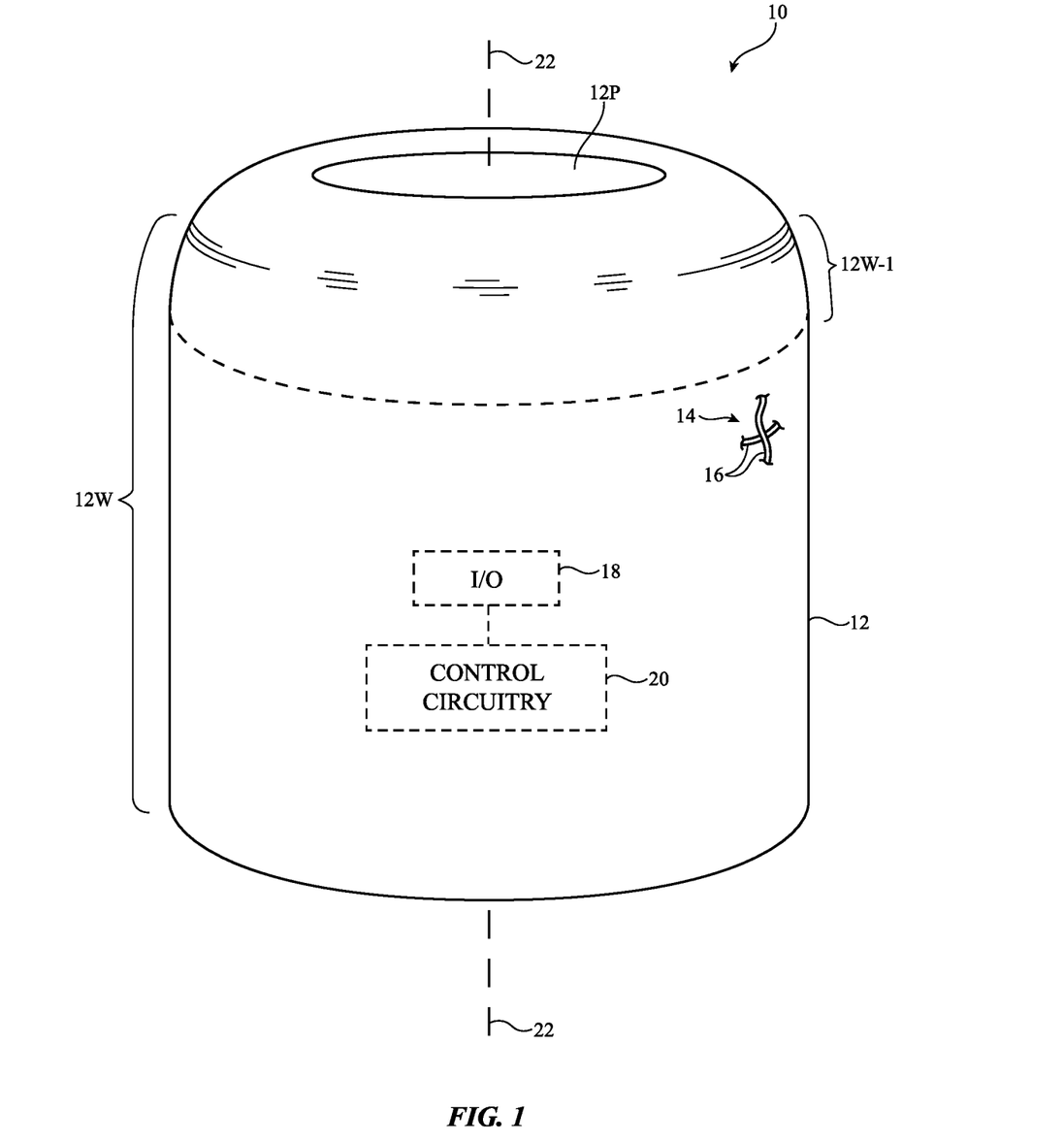
FIG. 1 is a perspective view of an illustrative electronic device having a housing covered with a fabric layer in accordance with some embodiments.

Items such as item 10 of FIG. 1 may include fabric. For example, fabric may be used in forming one or more covering layers for item 10 of FIG. 1. Item 10 may be an electronic device or an accessory for an electronic device such as a voice-controlled electronic device (sometimes referred to as a digital assistant or voice-controlled speaker), a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based item 10 is mounted in a kiosk, in an automobile, airplane, or other vehicle, other electronic equipment, or equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, shirt, pants, shoes, etc.), or may be any other suitable fabric-based item. In the illustrative configuration of FIG. 1, item 10 is a voice-controlled electronic device such as a voice-controlled speaker with internet access. Other types of devices may incorporate fabric, if desired.

As shown in FIG. 1, item 10 (sometimes referred to as device 10) may include a housing such as housing 12. Housing 12 may have a cylindrical shape with rounded upper and lower ends of the type shown in FIG. 1 or other suitable shape (e.g., a pyramidal shape, a conical shape, a box shape such as a rectangular box shape, a spherical shape, etc.). In FIG. 1, the cylindrical shape is characterized by a longitudinal axis 22. Housing 12 may include support structures formed from metal, polymer, ceramic, glass, wood, other materials, and/or combinations of these materials. The shape of housing 12 may be selected to form an enclosure suited to the type of item 10 for which the housing is being used. As an example, in scenarios in which item 10 is a voice-controlled electronic device, housing 12 may be cylindrical, pyramidal, box-shaped, conical, spherical, or other shapes suitable for enclosing one or more speakers, in configurations in which item 10 is a laptop computer, housing 12 may have upper and lower thin box-shaped portions that are joined with a hinge and that can respectively house a display and a keyboard, in configurations in which item 10 is a computer monitor containing an embedded computer, housing 12 may have a slender box shape with optionally curved rear housing walls that can hold a display and be mounted on a stand, in configurations in which item 10 is a tablet computer, cellular telephone, media player, or other handheld or portable electronic device, housing 12 may have a rectangular outline and a thin depth, in configurations in which item 10 is a smaller device such as a wristwatch device or a pendant device, housing 12 may have a thin profile and an outline that is rectangular, square, hexagonal, triangular, oval, or circular, in configurations in which item 10 is a headphone or earpiece device, housing 12 may have a shape configured to fit on or in a user's ear, in configurations in which item 10 is a pair of eyeglasses or other equipment worn on a user's head, housing 12 may have a head-mountable shape, in configurations in which item 10 is a jacket or other item of clothing (e.g., a hat, belt, wrist band, headband, shirt, pants, shoes, etc.), housing 12 may be formed from layers of fabric or other material configured to allow item 10 to be worn on a user's body, in configurations in which item 10 is a television, a computer display that does not contain an embedded computer, a gaming device, or a navigation device, housing 12 may have a rectangular outline, an outline with curved sides and/or straight sides, a box shape, a cylindrical shape, and/or other suitable shapes, in configurations in which item 10 is a kiosk, housing 12 can form a pedestal or other shape suitable for a kiosk, in configurations in which item 10 forms part of an automobile, airplane, or other vehicle, housing 12 may form a dashboard, console, door, window, seat, body panel, or other portion of the vehicle, in configurations in which item 10 is a removable external case for electronic equipment, housing 12 may have the shape of a sleeve or other structure with a recess for receiving the electronic equipment, in configurations in which item 10 is a strap, wrist band, necklace or headband, housing 12 may have a strip shape, in configurations in which item 10 forms a case, bag, or wallet, housing 12 may have surfaces that form the walls of the case and/or sides of the bag or wallet and/or that forms straps and/or other structures for the case or bag, and in configurations in which item 10 is part of furniture, housing 12 may be configured to form a part of a chair, sofa, or other seating (e.g., cushions or other seating structures). In the illustrative configuration of FIG. 1, housing 12 has a cylindrical shape suitable for an item such as a voice-controlled speaker with internet access. Housing 12 may have other shapes and may be incorporated into other items, if desired. The configuration of FIG. 1 is presented as an example.

Item 10 may include fabric 14. Fabric 14 may form all or part of a housing wall or other layer in an electronic device, may form the outermost layer of item 10, may form one or more inner covering layers, may form internal structures in an electronic device, or may form other fabric-based structures. This example is merely illustrative and fabric 14 may be omitted from item 10 if desired. Item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials. In an illustrative configuration, some or all of the upper surface of housing 12 such as portion 12P may be formed from rigid polymer or other non-fabric structure and the sidewall surfaces of housing 12 may be covered with fabric 14. Portion 12P may include touch sensors, light-emitting devices (e.g., light-emitting diodes that backlight button icons and/or that produce other visual output for a user), and/or other input-output components. If desired, fabric 14 may cover some or all of portion 12P. Fabric 14 may serve as a cosmetic cover for item 10 that overlaps audio components (microphones and/or speakers) and is permeable to sound and and/or may be incorporated into other portions of item 10.

Fabric 14 may include intertwined strands of material such as strands 16. Fabric 14 may, for example, include warp knit fabric that is formed by warp knitting of strands 16 and/or may include woven fabric, fabric with braided strands of material, etc. Strands 16 may be single-filament strands (sometimes referred to as fibers or monofilaments) or may be strands of material formed by intertwining multiple monofilaments of material together (sometimes referred to as yarns).

Strands 16 may be formed from polymer, metal, glass, graphite, ceramic, natural materials such as cotton or bamboo, or other organic and/or inorganic materials and combinations of these materials. Conductive coatings such as metal coatings may be formed on non-conductive material. For example, plastic strands in fabric 14 may be coated with metal to make them conductive. Reflective coatings such as metal coatings may be applied to make strands reflective. Strands formed from white polymer (e.g., light-scattering particles in polymer) and/or that are coated with white polymer may help reflect light in some configurations. If desired, strands may be formed from bare metal wires or metal wire intertwined with insulating monofilaments (as examples). Bare metal strands and strands of polymer covered with conductive coatings may be provided with insulating polymer jackets. In some configuration, strands 16 may include optical fibers (e.g., lossy optical fibers with surface roughening or other features that allow the strands to guide light while emitting portion of the guided light outwardly). Optical waveguide strands (e.g., lossy optical fibers formed from glass, transparent polymer, etc.) can be provided with light from light sources such as light-emitting diodes to display information (e.g., desired patterns of light). In some cases, it may be desirable for lossy fiber to appear dark or colored in reflection when illuminated by external light, so that the lossy fiber may match the appearance of other fibers. In these cases, the lossy fiber can include regions that are colored on the outside of the fiber but only leak light slightly or not at all and other regions that emit light due to roughen of the fiber surface or localized adjustments to the cladding of the fiber in that region (e.g., localized cladding thinning).

Items such as item 10 may, if desired, include control circuitry 20. Control circuitry 20 may include microprocessors, microcontrollers, application-specific integrated-circuits, digital signal processors, baseband processors, and/or other controllers and may include storage such as random-access memory, read-only memory, solid state drives, and/or other storage and processing circuitry.

Control circuitry 20 may gather information from sensors and other circuitry in input-output devices 18 and may use input-output devices 18 to supply output. Input-output devices 18 may, for example, include audio devices such as microphones and speakers. Microphones can gather audio input (e.g., sound that passes through fabric 14 such as voice commands for controlling the operation of item 10). Speakers can produce audio output (e.g., sound that passes through fabric 14). Sensors in input-output devices 18 may include touch sensors, force sensors, capacitive sensors, optical sensors, proximity sensors, strain gauges, temperature sensors, moisture sensors, gas sensors pressure sensors, magnetic sensors, position and orientation sensors (e.g., accelerometers, gyroscopes, and/or compasses), and/or other sensors. Light-emitting diodes, displays, and other visual output devices may be used in supply visual output to a user. As an example, visual output devices may be used to form illuminated buttons, displays that display images, visual feedback areas that display still and/or moving patterns of light to indicate to a user that a command has been received and/or is being processed by control circuitry 20, etc. Buttons, joysticks, haptic output components, and/or other input-output components may be provided in input-output devices 18 to gather input from a user and to provide a user with output. Wireless circuitry in circuitry 20 (e.g., wireless local area network circuitry, cellular telephone circuitry, etc.) may be used to support wireless communications with external equipment.

Light-emitting components (e.g., lasers or light-emitting diodes) may be arranged in an array of pixels to form a display or other light-based output device. As an example, one or more light-emitting components (sometimes referred to as light-emitting devices) may be formed under housing portion 12P on item 10. The light-emitting devices may be referred to as a display or an array of light-emitting devices. This example is merely illustrative. Instead or in addition, one or more light-emitting devices may be formed in a ring-shaped upper region 12W-1 that runs around the upper edge of item 10 and/or may be formed on one or more other portions of item 10.

Figure 2:
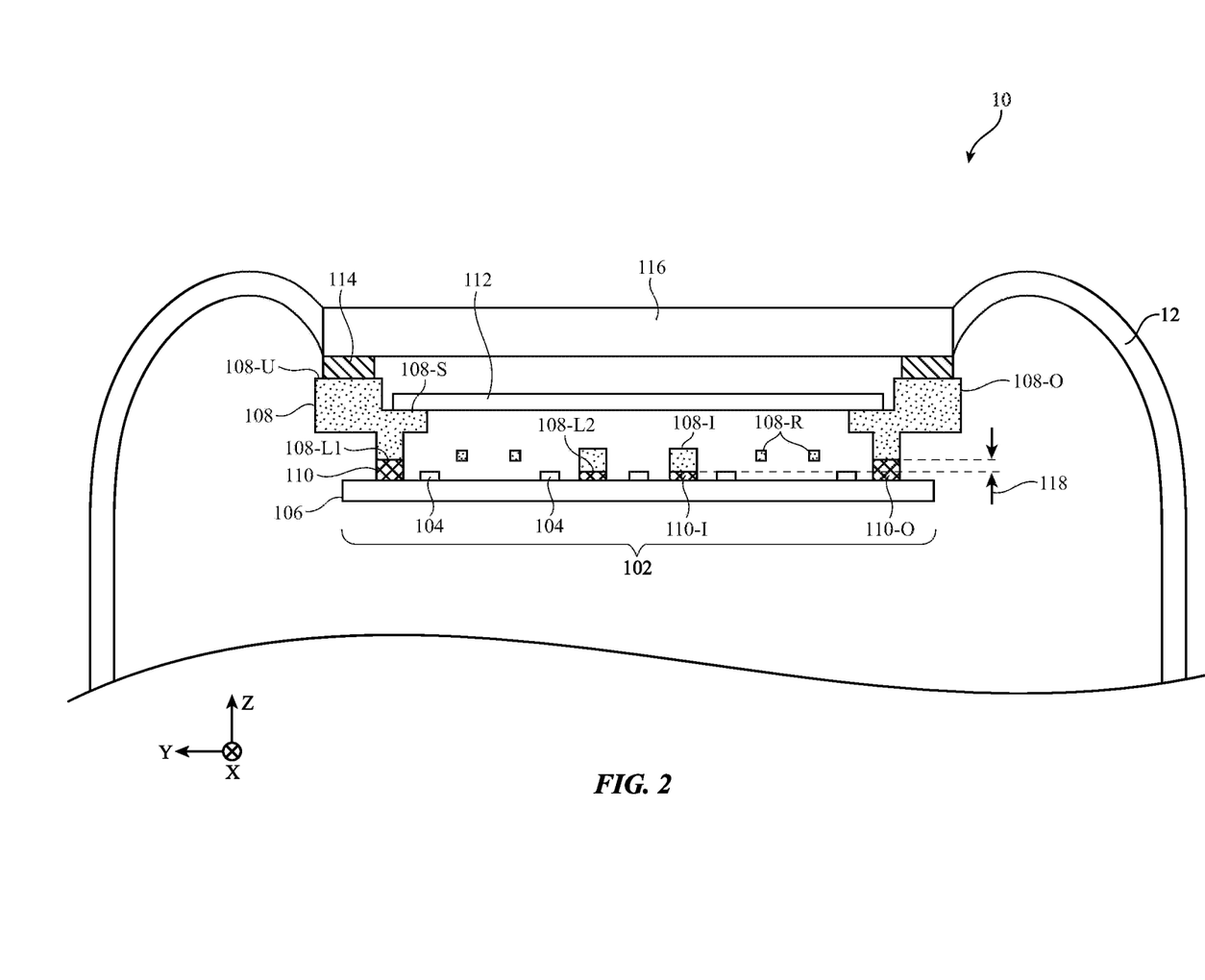
FIG. 2 is a cross-sectional side view of an illustrative electronic device having a display in accordance with some embodiments.

FIG. 2 is a cross-sectional side view of an illustrative item 10 with a display that emits light through a top surface of the item. As shown in FIG. 2, display 102 is formed within the interior of housing 12 for item 10. The display 102 is configured to emit light in the positive Z-direction through an upper surface of item 10 (e.g., parallel to the longitudinal axis 22 that characterizes the cylindrical item as shown in FIG. 1).

As shown in FIG. 2, display 102 may include light-emitting components 104 on a substrate 106. In one illustrative arrangement, substrate 106 is a printed circuit board and light-emitting components 104 are light-emitting diodes. Light-emitting components 104 may include light-emitting components of a single color (e.g., all of the light-emitting components emit white light) or light-emitting components of multiple colors (e.g., red, blue, and green light-emitting components). Display 102 may have a relatively low resolution. The pitch between adjacent light-emitting components of the same color may be greater than 100 microns, greater than 500 microns, greater than 1 millimeter, greater than 5 millimeters, greater than 1 centimeter, greater than 2 centimeters, greater than 3 centimeters, etc. This example is merely illustrative and in general display 102 may have any desired resolution.

As shown in FIG. 2, display 102 includes a shroud 108, an adhesive layer 110, a diffuser 112, foam 114, and display cover layer 116.

Shroud 108 (sometimes referred to as support structure 108, internal support structure 108, support ring 108, light-blocking ring 108, light-blocking structure 108, opaque support structure 108, etc.) may be formed from plastic or another desired material. The shroud is opaque to incident light from light-emitting components 104 (e.g., with a transparency of less than 20%, less than 10%, less than 5%, less than 3%, etc.) and therefore blocks light from the display from leaking into the interior of item 10 and escaping through the sidewalls of housing 12.

Shroud 108 has an outer ring 108-O, an inner ring 108-I, and intermediate ribs 108-R that are also formed in rings. Outer ring 108-O is formed in a ring around the periphery of display 102. The light-emitting components 104 emit light through a central opening defined by outer ring 108-O. Inner ring 108-I is formed in a ring around the center of display 102. At least one light-emitting component emits light through a central opening defined by inner ring 108-I. Intermediate ribs 108-R are concentric with inner ring 108-I and outer ring 108-O.

Outer ring 108-O is attached directly to the upper surface of substrate 106 with adhesive layer 110. Inner ring 108-I is also attached directly to the upper surface of substrate 106 with adhesive layer 110. Intermediate ribs 108-R are not coupled to the adhesive layer and are separated from the upper surface of substrate 106 by an air gap. The adhesive layer 110 includes an outer ring 110-O of adhesive that is attached to outer ring 108-O of the shroud. The adhesive layer 110 includes an inner ring 110-I of adhesive that is attached to inner ring 108-I of the shroud. Adhesive layer 110 may be formed from pressure sensitive adhesive or any other desired type of adhesive.

In addition to mitigating light leakage from display 102, shroud 108 serves as a support structure for diffuser 112. Diffuser 112 (sometimes referred to as diffusive plate 112, diffusive layer 112, diffusive disc 112, etc.) is formed as a circular disc. The perimeter of diffuser 112 is concentric with the outer ring of shroud 108. However, diffuser 112 does not have a central opening and instead has a solid circular footprint. Diffuser 112 may have an associated haze that is measured as the percentage of incident light scattered by more than 2.5 degrees through the diffuser. The haze of diffuser 112 may be greater than 10%, greater than 20%, greater than 30%, greater than 40%, greater than 50%, greater than 60%, less than 80%, less than 50%, etc.

The outer ring of shroud 108 has a lower surface 108-L1, an upper surface 108-U, and an intermediate shelf surface 108-S. Surfaces 108-L1, 108-U, and 108-S may be parallel or near parallel (e.g., within 10 degrees of parallel). Shelf surface 108-S is interposed between the upper surface 108-U and the lower surface 108-L1. The shelf surface 108-S supports diffuser 112. Foam 114 is formed on the upper surface 108-U. The outer ring 110-O of adhesive layer 110 is attached to the lower surface 108-L1.

The inner ring 108-I of shroud 108 has a lower surface 108-L2. The inner ring 110-I of adhesive layer 110 is attached to the lower surface 108-L2. It is noted that lower surface 108-L2 of the inner ring is closer to substrate 106 than lower surface 108-L1 of the outer ring. During assembly of display 102, adhesive layer 110 may first be attached to shroud 108. The shroud (with the attached adhesive layer) is then placed on substrate 106. When the shroud is placed on substrate 106, the adhesive layer 110 attaches to substrate 106. However, the adhesive layer 110 needs to be pressed into substrate 106 with sufficient force for strong adhesive contact. It may be difficult to apply pressure directly to the inner ring 108-I to ensure strong adhesive contact of the inner ring of adhesive 110-I. Having lower surface 108-L2 be closer to substrate 106 than lower surface 108-L1 ensures sufficient pressure is applied to the inner ring of adhesive during assembly. The offset 118 between the two lower surfaces may be greater than 50 micron, greater than 200 micron, greater than 500 micron, greater than 1 millimeter, greater than 5 millimeters, etc.

Foam 114 is interposed between upper surface 108-U of outer ring 108-O and a lower surface of display cover layer 116. Foam 114 may have a ring shape with a central opening. The footprint of foam 114 may overlap the footprint of outer ring 108-O. Foam 114 may be concentric with outer ring 108-O. Foam 114 may be formed from a compressive material and applies compressive force on display cover layer 116 and shroud 108. Foam 114 also fills the gap between shroud 108 and display cover layer 116, thus preventing light leakage.

Display cover layer 116 may include a transparent layer of material (e.g., glass, plastic, sapphire, etc.). Display cover layer 116 may have a touch sensor functionality and may sometimes be referred to as touch-sensitive layer 116, touch-sensitive display cover layer 116, or touch-sensitive outer layer 116. Display cover layer 116 may be attached to housing 12 on an upper surface of item 10 (as one example). Display cover layer 116 forms exterior surfaces of item 10 and may therefore sometimes be considered a portion of housing 12 for item 10.

Figure 3:
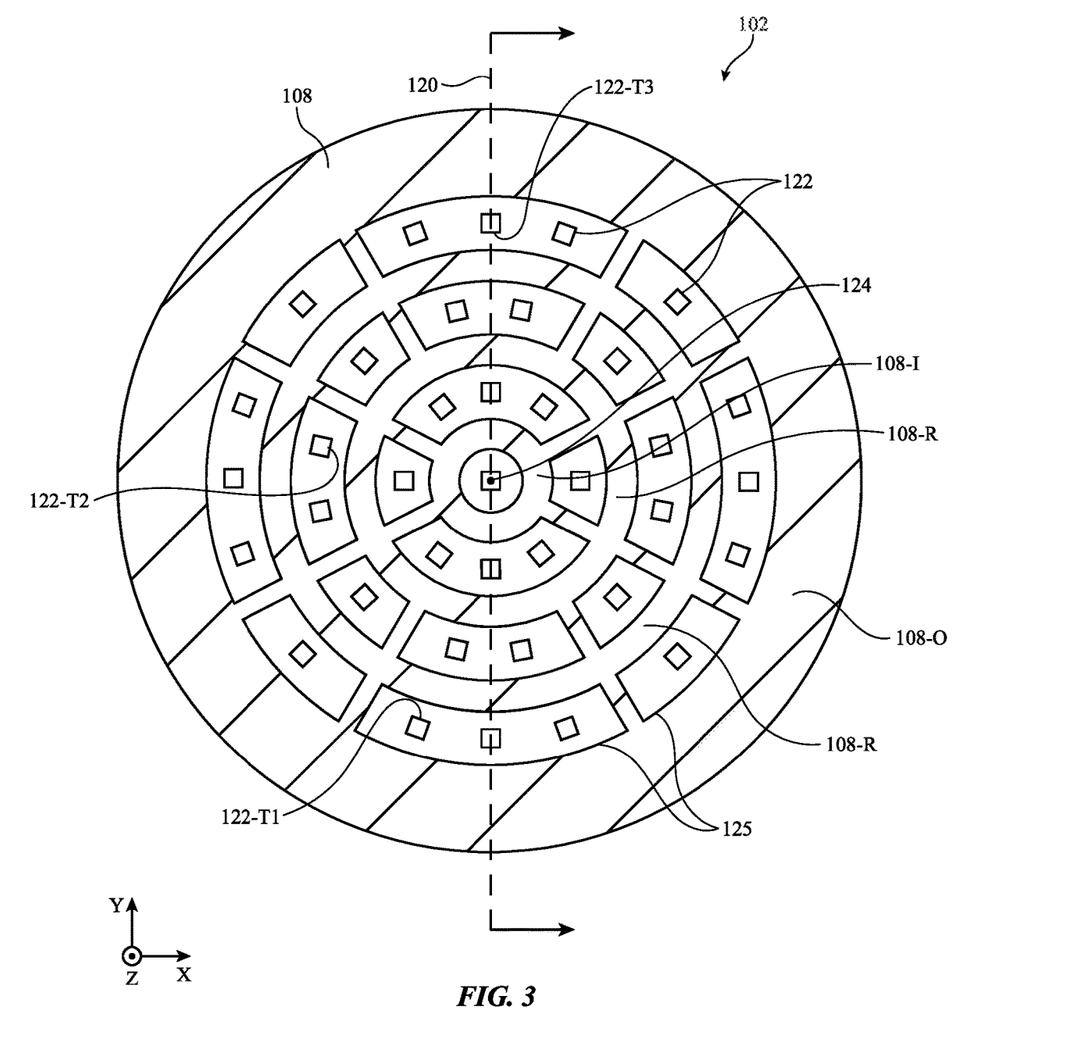
FIG. 3 is a top view of an illustrative electronic device having a display in accordance with some embodiments.

FIG. 3 is a top view of the display of FIG. 2. The cross-sectional side view of FIG. 2 may be taken along line 120 in FIG. 3. As shown in FIG. 3, shroud 108 defines a plurality of openings 125 that overlap light-emitting components. The light-emitting components emit light through the openings 125. In FIG. 3, the light-emitting components are arranged in light-emitting component groups 122. Each light-emitting component group may include one or more light-emitting components. As one illustrative example, each light-emitting component group includes one red light-emitting diode, one blue light-emitting diode, and one green light-emitting diode.

If each light-emitting component group 122 has the same layout and orientation, there may be color non-uniformity when the pitch between adjacent light-emitting component groups is too large. To mitigate color non-uniformity, the light-emitting component groups may be arranged with orientations based on their angular position relative to center 124 of the display. Each light-emitting component group 122 may have the same layout with an opposing top and bottom. The top of each light-emitting component group 122 may be facing the center 124 of the display. Consider the tops 122-T1, 122-T2, and 122-T3 of three representative light-emitting component groups. The top of each light-emitting component group is closer to the center of the display than an opposing bottom of that light-emitting component group. The top of each light-emitting component group is also approximately (e.g., within 10 degrees of) orthogonal to a line from that light-emitting component group to the center of the display.

Figure 4:
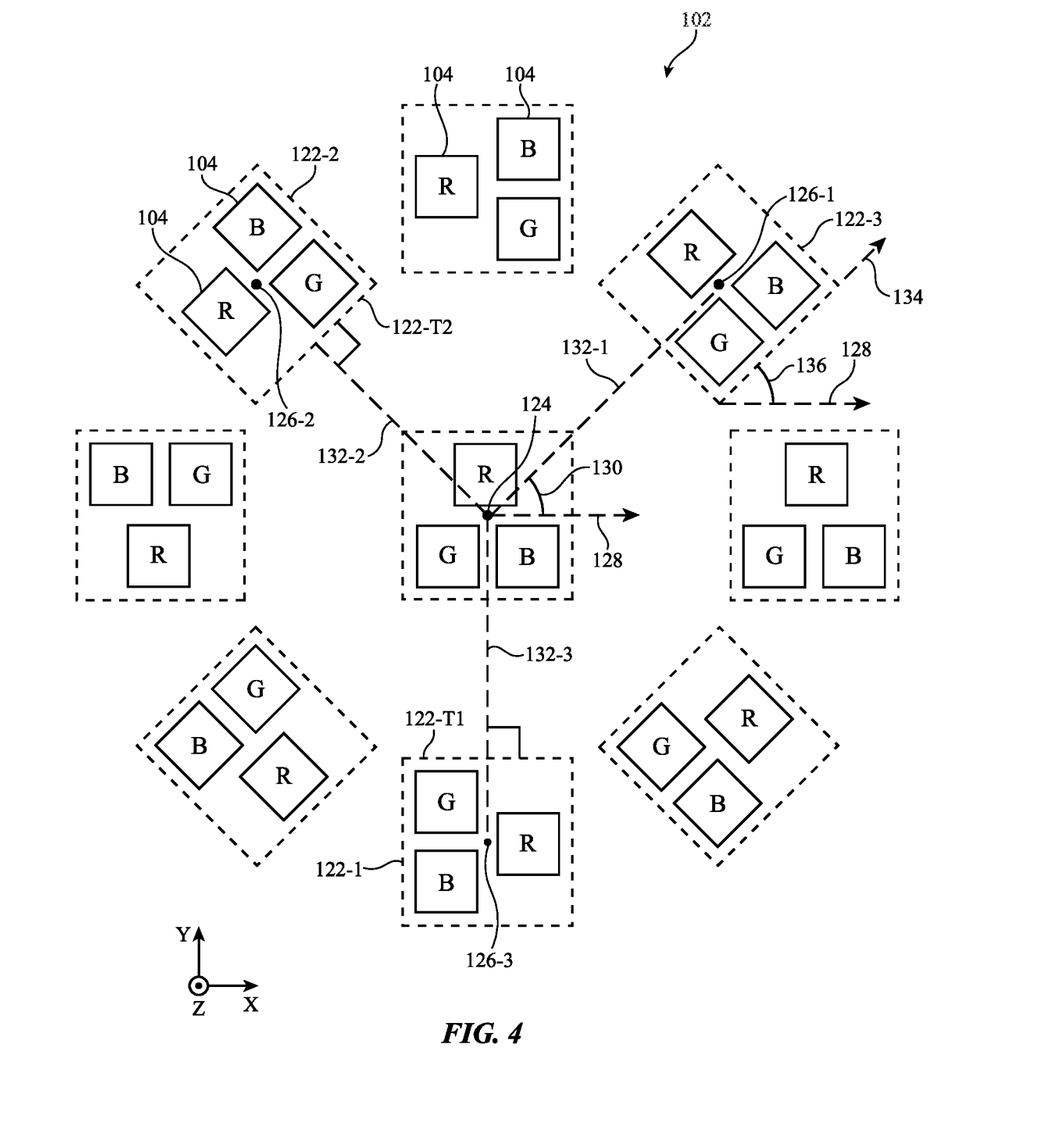
FIG. 4 is a top view of an illustrative display with light-emitting component groups that have orientations that vary as a function of angular position in accordance with some embodiments.

FIG. 4 is a detailed view of the varying orientation of the light-emitting component groups in display 102. FIG. 4 only shows a subset of the light-emitting components in display 102 but is representative of how the orientation varies as a function of angular position. The light-emitting component groups 122 include light-emitting components 104. In FIG. 4, green light-emitting diodes are labeled with a 'G', blue light-emitting diodes are labeled with a '13', and red light-emitting diodes are labeled with a 'R'.

The light-emitting component group aligned with center 124 is an exception and may have any desired orientation. However, the remaining, non-central light-emitting component groups may be orientated as a function of angular position relative to center 124. If a given light-emitting component group is defined as having an angular position of 0 degrees and an orientation of 0 degrees, each additional light-emitting component group will have an equal angular position and orientation (e.g., a first light-emitting component group has an angular position of 45 degrees and an orientation of 45 degrees, a second light-emitting component group has an angular position of 270 degrees and an orientation of 270 degrees, etc.).

Each light-emitting component group may have a respective center 126. Using a given reference line such as reference line 128 to define 0 degrees, each center 126 is at an angular position relative to center 124. The angular position may be determined by drawing a line from the display center 124 to the center 126 of the light-emitting component group and determining the angle between that line and the reference line 128. For example, line 132-1 is between center 124 and center 126-1. Line 132-1 is at angle 130 relative to reference line 128. Angle 130 therefore defines the angular position of light-emitting component group 122-3.

Each light-emitting component group has an orientation that varies as a function of angular position. Each light-emitting component group has the same layout, with one green light-emitting diode, one red light-emitting diode, and one blue light-emitting diode. However, the layout is rotated to different orientations depending on the angular position of the light-emitting group. As one example, the orientation of each light-emitting component group may be characterized using the side of the light-emitting component with the blue and green light-emitting diodes. Specifically, a line 134 may extend from the corner with the green light-emitting diode to the corner with the blue light-emitting component. This line 134 is at an angle 136 relative to reference line 128 (which is parallel to the X-axis in this example). Angle 136 is equal to angle 130 in this example. For each light-emitting component group, the angle 130 characterizing the angular position of that light-emitting component group may be equal to the angle 136 characterizing the orientation of that light-emitting component group. For example, angles 130 and 136 in FIG. 4 may both be equal to 45 degrees.

Each light-emitting component group has a top surface that is orthogonal or approximately (e.g., within 10 degrees of) orthogonal to a line between the center of that light-emitting component group and the center 124 of the display. Consider light-emitting component group 122-2 with center 126-2. As shown in FIG. 4, the top surface 122-T2 is approximately orthogonal to reference line 132-2 between center 126-2 and center 124. Similarly, top surface 122-T1 is approximately orthogonal to reference line 132-3 between center 126-3 and center 124.

Said another way, each light-emitting component group (aside from the group that overlaps center 124) may have a green light-emitting diode that is closer to the center of the display than the blue light-emitting diode. Each green light-emitting diode may have first and second opposing edges. The first edge may be adjacent to (and face) the blue light-emitting diode). The second edge may face the center 124. For each light-emitting component group, the second edge is interposed between the center and the first edge. Additionally, the second edge of each green light-emitting diode in each light-emitting component group may be approximately orthogonal to a line drawn from the center of that light-emitting component group to the center of the display.

Returning to FIG. 2, foam 114 may be formed from an opaque material (e.g., with a transparency of less than 20%, less than 10%, less than 5%, less than 3%, etc.) to block light from the display from leaking into the interior of item 10 and escaping through the sidewalls of housing 12. It may therefore be desirable for foam 114 to form a continuous ring around the display to ensure there is no leakage through the foam. However, it may also be preferable from a manufacturing and/or robustness perspective to have the foam formed using two or more discrete pieces. If care is not taken, light may leak between the gaps between the two or more discrete pieces of foam.

Figure 5:
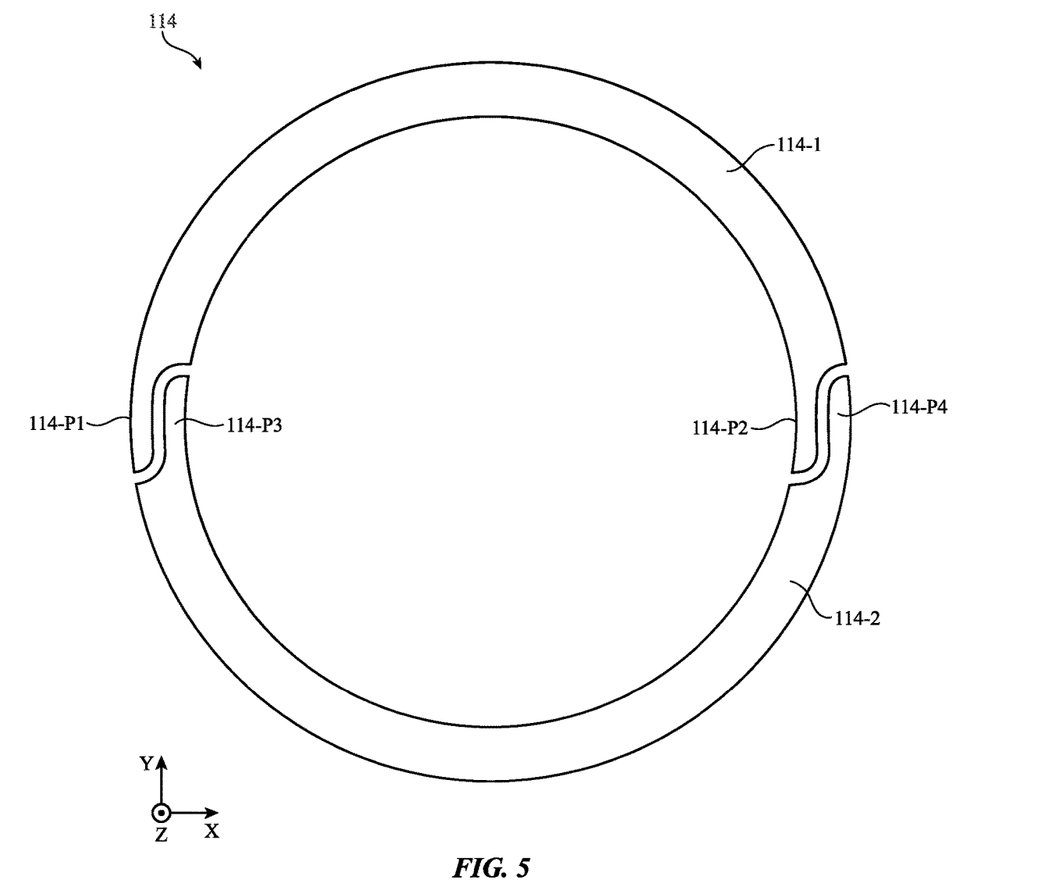
FIG. 5 is a top view of illustrative foam that may be used in an electronic device such as the electronic device of FIG. 2 in accordance with some embodiments.

FIG. 5 is a top view of foam 114 showing how the foam may be formed from two discrete pieces. In the example of FIG. 5, the foam includes a first piece 114-1 and a second piece 114-2. To prevent light leakage through gaps between pieces 114-1 and 114-2, the pieces have footprints with complementary protrusions that form interlocks at the interfaces between the pieces. On the left side in FIG. 5, foam 114-1 has a protrusion 114-P1 on an outer side of the ring whereas foam 114-2 has a protrusion 114-P3 on an inner side of the ring. The protrusion 114-1 extends into a recess of piece 114-2 whereas protrusion 114-P3 extends into a recess of piece 114-1. These complementary protrusions help mitigate light leakage through the gap between pieces 114-1 and 114-2.

On the right side in FIG. 5, foam 114-1 has a protrusion 114-P2 on an inner side of the ring whereas foam 114-2 has a protrusion 114-P4 on an outer side of the ring. The protrusion 114-P2 extends into a recess of piece 114-2 whereas protrusion 114-P4 extends into a recess of piece 114-1. These complementary protrusions help mitigate light leakage through the gap between pieces 114-1 and 114-2.

Returning to FIG. 2, adhesive layer 110 may be formed from an opaque material (e.g., with a transparency of less than 20%, less than 10%, less than 5%, less than 3%, etc.) to block light from the display from leaking into the interior of item 10 and escaping through the sidewalls of housing 12. It may therefore be desirable for adhesive layer 110 to form a continuous outer ring 110-O around the display to ensure there is no leakage through the adhesive layer. However, it may be preferrable from a manufacturing and/or robustness perspective to have the adhesive layer formed using two or more discrete pieces. If care is not taken, light may leak between the gaps between the two or more discrete pieces of adhesive layer 110.

Figure 6:
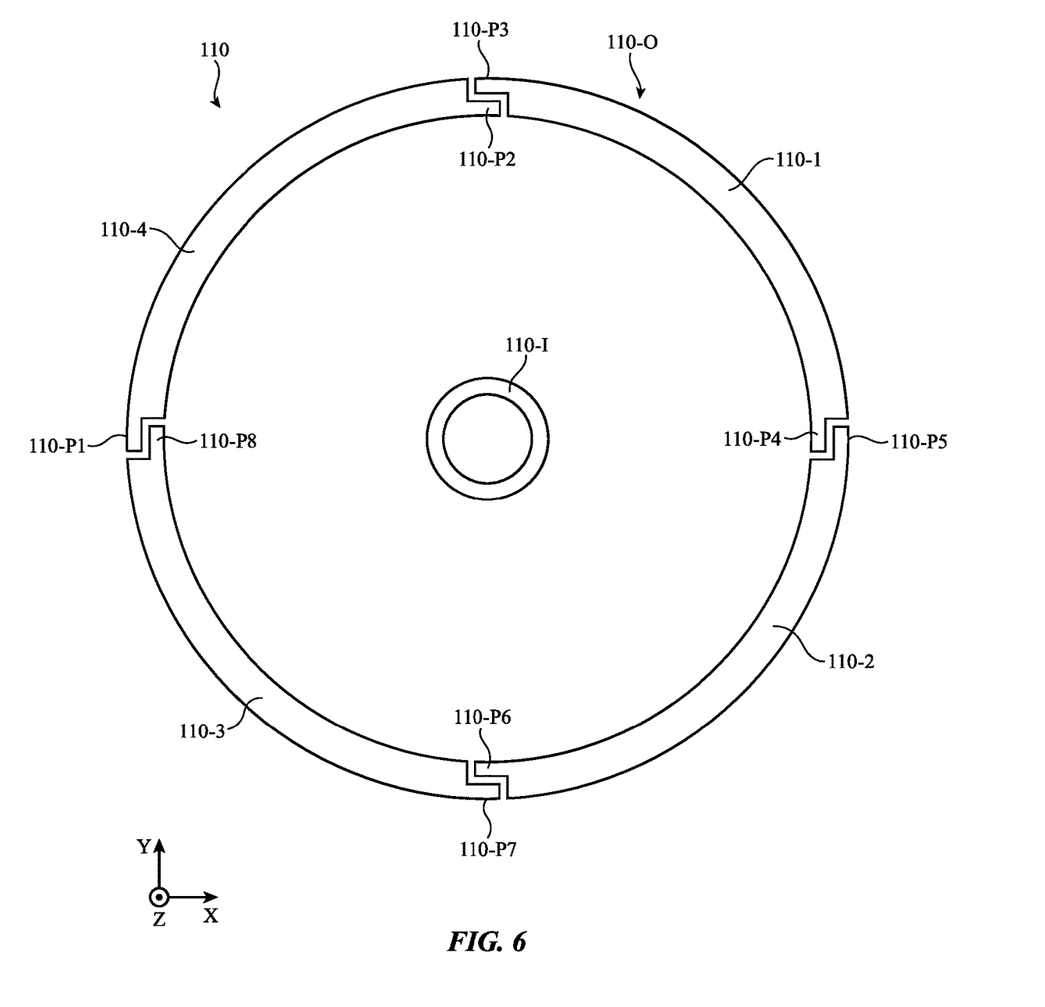
FIG. 6 is a top view of an illustrative adhesive layer that may be used in an electronic device such as the electronic device of FIG. 2 in accordance with some embodiments.

FIG. 6 is a top view of adhesive layer 110 showing how the outer ring of the adhesive layer may be formed from four discrete pieces. In the example of FIG. 6, the adhesive layer includes a continuous inner ring 110-I and an outer ring 110-O with four discrete pieces: 110-1, 110-2, 110-3, and 110-4. To prevent light leakage through gaps between pieces 110-1, 110-2, 110-3, and 110-4, the pieces have complementary protrusions that form interlocks at the interfaces between the pieces. Piece 110-1 has protrusions 110-P3 and 110-P4, piece 110-2 has protrusions 110-P5 and 110-P6, piece 110-3 has protrusions 110-P7 and 110-P8, and piece 110-4 has protrusions 110-P1 and 110-P2.

On the left side in FIG. 6, adhesive layer 110-4 has a protrusion 110-P1 on an outer side of the ring whereas adhesive layer 110-3 has a protrusion 110-P8 on an inner side of the ring. The protrusion 110-P1 extends into a recess of piece 110-3 whereas protrusion 110-P8 extends into a recess of piece 110-4. These complementary protrusions help mitigate light leakage through the gap between pieces 110-3 and 110-4. A similar arrangement is used at each interface between discrete pieces of the adhesive layer to mitigate light leakage through the gaps between the pieces.

The red, blue, and green light-emitting diodes in display 102 may respond differently to temperature changes. Red light-emitting diodes may decrease in luminance with increasing temperature (and, correspondingly, increase in luminance with decreasing temperature). Green light-emitting diodes may decrease in luminance with increasing temperature (and, correspondingly, increase in luminance with decreasing temperature), but at a lower rate than red light-emitting diodes. Blue light-emitting diodes may increase in luminance with increasing temperature (and, correspondingly, decrease in luminance with decreasing temperature). If care is not taken, these varying responses to temperature may cause color non-uniformity and/or overall display white point shift as the temperature of the display changes.

Figure 7A:
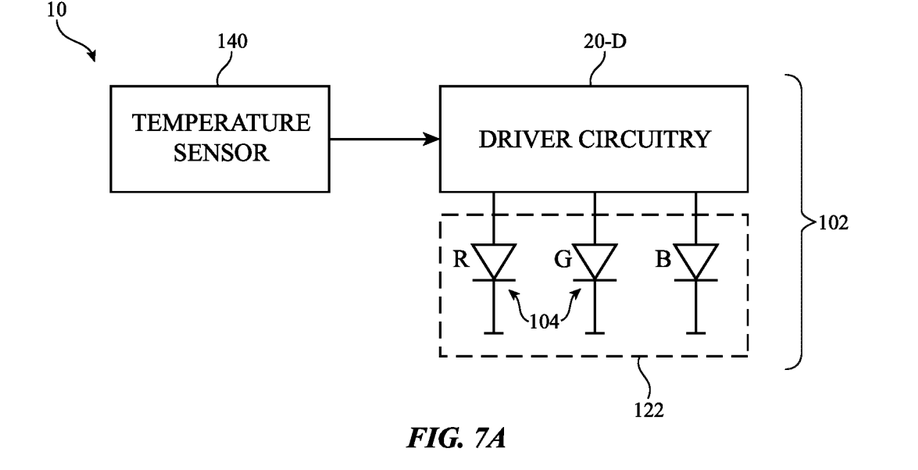
FIG. 7A is a diagram of an illustrative electronic device with driver circuitry that receives temperature information from a temperature sensor in accordance with some embodiments.

FIG. 7A is a schematic diagram of an illustrative electronic device showing one option for mitigating color non-uniformity and/or display white point shift caused by temperature changes. As shown in FIG. 7A, display 102 may include driver circuitry 20-D in addition to light-emitting component groups 122. Although only one light-emitting component group is shown in FIG. 7A (with a red light-emitting diode (R), a green light-emitting diode (G), and a blue light-emitting diode (B)), it should be understood that driver circuitry 20-D may control all of the light-emitting component groups in the display.

Driver circuitry 20-D may include circuitry for driving light-emitting components 104. In particular, the driver circuitry 20-D may control the current applied to each light-emitting component to control the luminance of each light-emitting component.

To compensate for temperature, driver circuitry 20-D may receive temperature information from temperature sensor 140 in item 10. The driver circuitry 20-D may have gamma lookup tables with different associated temperatures and may use the appropriate gamma lookup table based on the temperature information received from temperature sensor 140. This example is merely illustrative and in general driver circuitry 20-D may use any desired techniques to control the light-emitting components based on the temperature information received from temperature sensor 140.

Figure 7B:
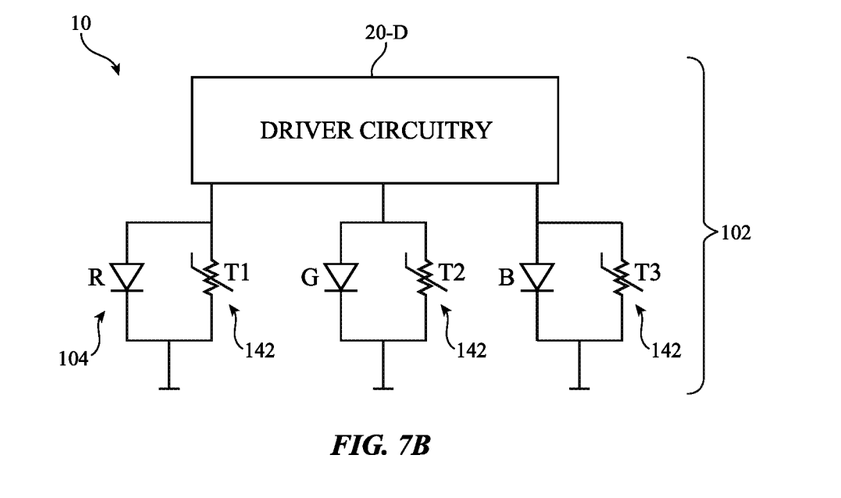
FIG. 7B is a diagram of an illustrative electronic device with light-emitting diodes that have associated thermistors in accordance with some embodiments.

In alternative arrangement, shown in FIG. 7B, the temperature sensor may be omitted from electronic device 10 and display 102 operates without using temperature information. Similar to as in FIG. 7A, driver circuitry 20-B controls the current applied to each light-emitting component to control the luminance of each light-emitting component. Although only one light-emitting component group is shown in FIG. 7B (with a red light-emitting diode (R), a green light-emitting diode (G), and a blue light-emitting diode (B)), it should be understood that driver circuitry 20-D may control all of the light-emitting component groups in the display.

In FIG. 7B, each light-emitting component 104 (in this case light-emitting diode) has an associated thermistor 142. Specifically, each light-emitting component is connected in parallel with a respective thermistor 142. The red light-emitting diode R is connected in parallel with a first thermistor T1, the green light-emitting diode G is connected in parallel with a second thermistor T2, and the blue light-emitting diode B is connected in parallel with a third thermistor T3. Thermistors T1 and T2 may be positive temperature coefficient (PTC) thermistors. In PTC thermistors, the resistance increases with increasing temperature. As the temperature increases, the resistance of T1 will increase, causing more current to flow through the red light-emitting diode. This compensates for the drop of the luminance with increasing temperature that may otherwise occur in the red light-emitting diode. As the temperature increases, the resistance of T2 will also increase, causing more current to flow through the green light-emitting diode. This compensates for the drop of the luminance with increasing temperature that may otherwise occur in the green light-emitting diode. It is noted that because the red light-emitting diode has a greater slope of luminance drop as a function of increasing temperature (compared to the green LED), thermistor T1 (for the red LED) may have a greater increase in resistance with increasing temperature (compared with thermistor T2 for the green LED).

Thermistor T3 may be a negative temperature coefficient (NTC) thermistor. In NTC thermistors, the resistance decreases with increasing temperature. As the temperature increases, the resistance of T3 will decrease, causing less current to flow through the blue light-emitting diode. This compensates for the increase of the luminance with increasing temperature that may otherwise occur in the blue light-emitting diode.

FIG. 7B shows a constant-current arrangement for the light-emitting diodes. Alternatively, a constant-voltage arrangement may be used. In the constant-voltage arrangement, the red LED may be connected in series with a NTC thermistor, the green LED may be connected in series with a NTC thermistor, and the blue LED may be connected in series with a PTC thermistor.

When thermistors are used as in FIG. 7B, driver circuitry 20-D may use a single gamma lookup table that is calibrated at a given temperature. The thermistors may compensate for luminance changes caused by temperature without driver circuitry 20-D needing to know the temperature directly. A temperature sensor is therefore not needed to preserve satisfactory color uniformity and white point stability in the display, reducing the cost and complexity of device 10.

The foregoing is merely illustrative and various modifications can be made to the described embodiments. The foregoing embodiments may be implemented individually or in any combination.

What is claimed is:

1. An electronic device, comprising:
a housing;
a speaker in the housing configured to emit sound; and
a display in the housing, wherein the display comprises:
a substrate;
light-emitting components mounted on the substrate;
an opaque support structure mounted on the substrate;
a diffuser that is mounted to the opaque support structure and that overlaps the light-emitting components;
a display cover layer that overlaps the diffuser;
foam that is interposed between the opaque support structure and the display cover layer, wherein the foam comprises at least first and second discrete pieces and wherein the first and second discrete pieces have footprints with interlocking protrusions and recesses; and
an adhesive layer that attaches a lower surface of the opaque support structure to the substrate, wherein the adhesive layer comprises at least third and fourth discrete pieces and wherein the third and fourth discrete pieces have additional footprints with interlocking protrusions and recesses.

2. The electronic device defined in claim 1, wherein the opaque support structure has an outer ring with an upper surface, the lower surface, and an additional surface that is interposed between the upper surface and the lower surface.

3. The electronic device defined in claim 2, wherein the diffuser is mounted to the additional surface of the opaque support structure.

4. The electronic device defined in claim 1, wherein the adhesive layer, the outer ring of the opaque support structure, and the foam are concentric.

5. The electronic device defined in claim 1, wherein the foam forms a ring around the display, wherein the first discrete piece has a first protrusion on an outer side of the ring and a first recess on an inner side of the ring, and wherein the second discrete piece has a second protrusion on an inner side of the ring and a second recess on an outer side of the ring.

6. The electronic device defined in claim 1, wherein the opaque support structure has an outer ring and an inner ring that is concentric with the outer ring, wherein the outer ring has a first lower surface, wherein the inner ring has a second lower surface, and wherein there is an offset between the first and second lower surfaces.

7. The electronic device defined in claim 1, wherein the opaque support structure has an outer ring and an inner ring that is concentric with the outer ring, wherein the outer ring has a first lower surface, wherein the inner ring has a second lower surface, wherein the first lower surface is separated from the substrate by a first distance, and wherein the second lower surface is separated from the substrate by a second distance that is less than the first distance.

8. The electronic device defined in claim 1, wherein the display has a center, wherein the light-emitting components are arranged in groups, wherein each group has a layout and an orientation, wherein the layouts of the groups are the same, wherein a subset of the groups is positioned around the center, and wherein the orientations of the subset of the groups vary as a function of angular position relative to the center.

9. The electronic device defined in claim 1, further comprising:
a fabric layer having openings configured to allow the sound to pass.

10. The electronic device defined in claim 1, wherein the foam applies compressive force on the display cover layer and the opaque support structure.

11. An electronic device, comprising:
a housing;
a speaker in the housing configured to emit sound; and
a display in the housing, wherein the display comprises:
a substrate;
light-emitting components mounted on the substrate;
an opaque support structure mounted on the substrate;
a diffuser that is mounted to the opaque support structure and that overlaps the light-emitting components;
a display cover layer that overlaps the diffuser;
foam that is interposed between the opaque support structure and the display cover layer; and
an adhesive layer that attaches a lower surface of the opaque support structure to the substrate, wherein the opaque support structure is interposed between the adhesive layer and the foam, wherein the adhesive layer comprises at least first and second discrete pieces, and wherein the first and second discrete pieces have footprints with complementary interlocking protrusions and recesses.

12. The electronic device defined in claim 11, wherein the adhesive layer comprises third and fourth discrete pieces and wherein the third and fourth discrete pieces have additional footprints with additional complementary protrusions and recesses.

13. The electronic device defined in claim 11, wherein the complementary interlocking protrusions and recesses are configured to mitigate light leakage through a gap between the first and second discrete pieces.

14. The electronic device defined in claim 11, wherein the complementary interlocking protrusions and recesses form an interlock between the first and second discrete pieces.

* * * * *